US012412091B2

United States Patent
Chiu et al.

(10) Patent No.: US 12,412,091 B2
(45) Date of Patent: Sep. 9, 2025

(54) PHYSICS-GUIDED DEEP MULTIMODAL EMBEDDINGS FOR TASK-SPECIFIC DATA EXPLOITATION

(71) Applicant: SRI INTERNATIONAL, Menlo Park, CA (US)

(72) Inventors: Han-Pang Chiu, West Windsor, NJ (US); Zachary Seymour, Pennington, NJ (US); Niluthpol C. Mithun, Lawrenceville, NJ (US); Supun Samarasekera, Skillman, NJ (US); Rakesh Kumar, West Windsor, NJ (US); Yi Yao, Princeton, NJ (US)

(73) Assignee: SRI International, Menlo Park, CA (US)

( * ) Notice: Subject to any disclaimer, the term of this patent is extended or adjusted under 35 U.S.C. 154(b) by 262 days.

(21) Appl. No.: 17/781,827

(22) PCT Filed: Feb. 11, 2021

(86) PCT No.: PCT/US2021/017731
§ 371 (c)(1),
(2) Date: Jun. 2, 2022

(87) PCT Pub. No.: WO2021/183256
PCT Pub. Date: Sep. 16, 2021

(65) Prior Publication Data
US 2023/0004797 A1 Jan. 5, 2023

Related U.S. Application Data

(60) Provisional application No. 62/987,697, filed on Mar. 10, 2020.

(51) Int. Cl.
*G06N 3/045* (2023.01)
*G06N 3/08* (2023.01)

(52) U.S. Cl.
CPC ............... *G06N 3/08* (2013.01); *G06N 3/045* (2023.01)

(58) Field of Classification Search
CPC ................. G06N 3/08; G06N 3/045
See application file for complete search history.

(56) References Cited

U.S. PATENT DOCUMENTS

2011/0170781 A1 7/2011 Bronstein et al.
2018/0284758 A1* 10/2018 Cella .................. H04L 1/18
(Continued)

FOREIGN PATENT DOCUMENTS

JP 2014512897 A 5/2014
JP 2019535063 A 12/2019
(Continued)

OTHER PUBLICATIONS

Huang, Z., et al, Multi-Modal Sensor Fusion-Based Deep Neural Network for End-to-End Autonomous Driving With Scene Understanding, [received Jul. 12, 2024]. Retrieved from Internet: <https://ieeexplore.ieee.org/abstract/document/9119447> (Year: 2020).*
(Continued)

*Primary Examiner* — Miranda M Huang
*Assistant Examiner* — Bart I Rylander
(74) *Attorney, Agent, or Firm* — MOSER TABOADA

(57) ABSTRACT

A method, apparatus and system for object detection in sensor data having at least two modalities using a common embedding space includes creating first modality vector representations of features of sensor data having a first modality and second modality vector representations of features of sensor data having a second modality, projecting the first and second modality vector representations into the common embedding space such that related embedded modality vectors are closer together in the common embedding space than unrelated modality vectors, combining the
(Continued)

projected first and second modality vector representations, and determining a similarity between the combined modality vector representations and respective embedded vector representations of features of objects in the common embedding space to identify at least one object depicted by the captured sensor data. In some instances, data manipulation of the method, apparatus and system can be guided by physics properties of a sensor and/or sensor data.

20 Claims, 10 Drawing Sheets

(56) References Cited

U.S. PATENT DOCUMENTS

| | | | |
|---|---|---|---|
| 2018/0375743 A1 | 12/2018 | Lee et al. | |
| 2019/0135300 A1 | 5/2019 | Gonzalez Aguirre et al. | |
| 2019/0197400 A1 | 6/2019 | Zhang et al. | |
| 2019/0293462 A1* | 9/2019 | Choi | G06N 3/045 |
| 2019/0318040 A1 | 10/2019 | Chaudhury et al. | |
| 2019/0325342 A1 | 10/2019 | Sikka et al. | |
| 2020/0018852 A1* | 1/2020 | Walls | G01S 7/4972 |

FOREIGN PATENT DOCUMENTS

| | | | |
|---|---|---|---|
| KR | 10-2017-0098573 A | 8/2017 | |
| WO | WO-2018104563 A2 | 6/2018 | |
| WO | WO 2018-124309 A1 | 7/2018 | |
| WO | WO-2019010137 A1 | 1/2019 | |
| WO | WO-2019016968 A1 | 1/2019 | |
| WO | WO-2019057954 A1 | 3/2019 | |
| WO | WO-2019220622 A1 * | 11/2019 | G06K 9/2054 |
| WO | WO-2019231624 A2 | 12/2019 | |
| WO | WO-2019049856 A1 | 2/2020 | |

OTHER PUBLICATIONS

Hang, Z. et al, Multi-Modal Sensor Fusion-Based Deep Neural Network for End-to-End Autonomous Driving With Scene Understanding, [received Jul. 12, 2024]. Retrieved from Internet:<https://ieeexplore.ieee.org/abstract/document/9119447> (Year: 2020).*

Roheda, S., et al, Robust Multi-Modal Sensor Fusion: An Adversarial Approach, [received [Jul. 12, 2024]. Retrieved from Internet:<https://ieeexplore.ieee.org/abstract/document/9174786> (Year: 2020).*

Priyasad, D., et al, Attention Driven Fusion for Multi-Modal Emotion Recognition, [received Jul. 12, 2024]. Retrieved from Internet:<https://ieeexplore.ieee.org/abstract/document/9054441> (Year: 2020).*

Chen, C., et al, Selective Sensor Fusion for Neural Visual-Inertial Odometry, [received Nov. 25, 2024]. Retrieved from Internet:<https://openaccess.thecvf.com/content_CVPR_2019/html/Chen_Selective_Sensor_Fusion_for_Neural_Visual-Inertial_Odometry_CVPR_2019_paper.html> (Year: 2019).*

Yufu Qu et al., "Active Multimodal Sensor System for Target Recognition and Tracking", Sensors, vol. 7, Jun. 28, 2017.

Ying Zhang et al., "Deep Cross-Modal Projection Learning for Image-Text Matching", Computer Vision—ECCV 2018, Oct. 6, 2018.

International Search Report for application No. PCT/US2021/017731 dated Jun. 9, 2021.

Valentin Vielzeuf et al., "Multilevel Sensor Fusion With Deep Learning" Sensors Letter, Jan. 2019, vol. 3, No. 1, Nov. 7, 2018, pp. 1-12.

Yufu Qu et al., "Active Multimodal Sensor System for Target Recognition and Tracking", Sensors, Jun. 28, 2017, vol. 17, pp. 1-22.

* cited by examiner

PHYSICS-GUIDED DEEP MULTIMODAL EMBEDDINGS FOR TASK-SPECIFIC DATA EXPLOITATION

FIELD

Embodiments of the present principles generally relate to the evaluation and generation of sensor data, and more particularly, to the evaluation and generation of sensor data using multimodal embeddings.

BACKGROUND

Sensor fusion for tasks such as target detection and recognition in challenging environments is an important problem to solve in many fields. However, sensor data in these environments is typically very noisy in nature. In addition, data captured using different sensors can be dramatically different due to diverse physical characteristics. Current sensor fusion methods for these tasks are limited to early stage fusion (raw data level) for same (or similar) types of sensors. They cannot fuse complementary information from different types of sensors to achieve more robust and accurate task performance. In addition, past approaches to tasks such as target detection and recognition focus on one single data source and rely on extracting hand-crafted features or deep-learned features.

SUMMARY

Embodiments of methods, apparatuses and systems for object detection in sensor data having at least two modalities using a common embedding space are disclosed herein.

In some embodiments in accordance with the present principles, a method for training a common embedding space for combining sensor data captured of a common scene having at least two modalities includes for each of a plurality of the captured sensor data having a first modality of the at least two modalities, creating respective first modality sensor-data vector representations of the features of the sensor data having the first modality using a sensor data-specific neural network (e.g., convolutional neural network, recurrent neural network, transformer, etc.) for each of a plurality of the captured sensor data having a second modality of the at least two modalities, creating respective second modality sensor-data vector representations of the features of the sensor data having the second modality using a sensor data-specific neural network, embedding the first modality sensor-data vector representations and the second modality sensor-data vector representations in a common embedding space such that embedded modality vectors that are related, across modalities, are closer together in the common embedding space than unrelated modality vectors, and respectively combining the embedded first modality sensor-data vector representations and the second modality vector representations.

In some embodiments of the present principles, the method can further include constraining at least one of the creating of the first and second modality sensor-data vector representations and the embedding of the first and the second modality sensor-data vector representations by physics properties of at least one of a respective sensor having captured the first modality sensor data and the second modality sensor data, and physics properties of the first modality sensor data and the second modality sensor data.

In some embodiments in accordance with the present principles, a method for object detection in sensor data having at least two modalities using a common embedding space includes creating respective first modality sensor-data vector representations of features of sensor data having a first modality of the at least two modalities, creating respective second modality sensor-data vector representations of features of sensor data having a second modality of the at least two modalities, projecting the first modality sensor-data vector representations and the second modality sensor-data vector representations into the common embedding space such that embedded modality vectors that are related, across modalities, are closer together in the common embedding space than unrelated modality vectors, combining the projected first modality sensor-data vector representations and the second modality sensor-data vector representations, and determining a similarity between the combined modality sensor-data vector representations and respective embedded vector representations of features of objects in the common embedding space using a distance function to identify at least one object depicted by the sensor data having the at least two modalities.

In some embodiments of the present principles, the method can further include constraining at least one of the creating of the first and second modality sensor-data vector representations and the embedding of the first and the second modality sensor-data vector representations by physics properties of at least one of a respective sensor having captured the first modality sensor data and the second modality sensor data, and physics properties of the first modality sensor data and the second modality sensor data.

In some embodiments in accordance with the present principles, an apparatus for object detection in sensor data having at least two modalities using a common embedding space includes at least one feature extraction module configured to create respective first modality sensor-data vector representations of features of sensor data having a first modality of the at least two modalities and respective second modality sensor-data vector representations of features of sensor data having a second modality of the at least two modalities, at least one embedding module configured to project the first modality sensor-data vector representations and the second modality sensor-data vector representations into the common embedding space such that embedded modality vectors that are related, across modalities, are closer together in the common embedding space than unrelated modality vectors, a fusion module configured to combine the projected first modality sensor-data vector representations and the second modality sensor-data vector representations, and an inference module configured to determine a similarity between the combined modality sensor-data vector representations and respective embedded vector representations of features of objects in the common embedding space using a distance function to identify at least one object depicted by the sensor data having the at least two modalities.

In some embodiments of the present principles, the apparatus can further be configured to constrain/guide at least one of the creating of the first and second modality sensor-data vector representations and the embedding of the first and the second modality sensor-data vector representations by physics properties of at least one of a respective sensor having captured the first modality sensor data and the second modality sensor data, and physics properties of the first modality sensor data and the second modality sensor data.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
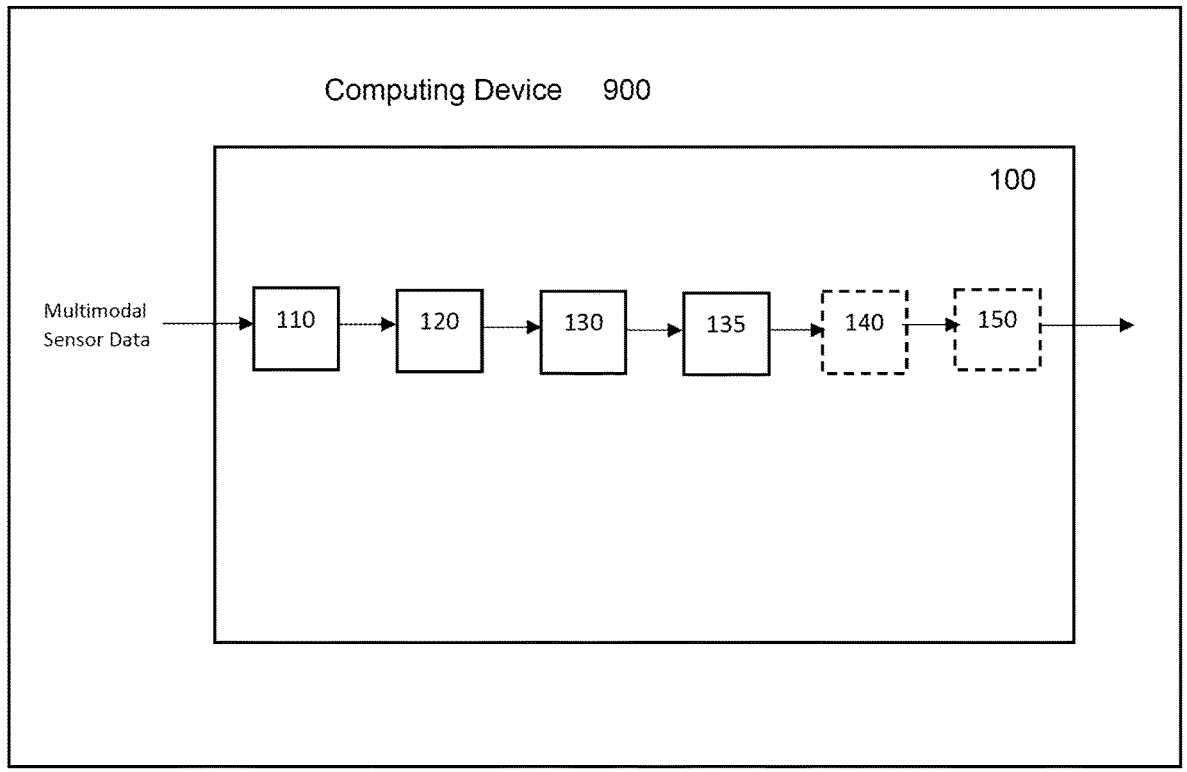
FIG. 1 depicts a high-level block diagram of a sensor data fusion system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for sensor data fusion for combining sensor data from multiple and different types of sensors having multiple modalities using multimodal embeddings. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific sensors, such teachings should not be considered limiting. Embodiments in accordance with the present principles can function with substantially any sensor and/or detector.

Some embodiments of the present principles provide an end-to-end pipeline system that fuses multi-sensor (i.e., multi-modal) data in a common embedding space by directly optimizing target metrics and learning the contribution of each sensor (mode) to the results. In some embodiments, physics properties of the respective sensors and/or the sensor data, such as physics equations and principles, are incorporated into learning feature extraction, that ensures physical properties of each sensor are recoverable from their low-dimensional representations, to facilitate learning with fewer examples while maintaining generalization performance.

Some embodiments of the present principles include attention-based mode fusion, which can include learning an importance of each sensor (mode), in some embodiments through self-attention mechanism, that provides the information for selecting modes based on available payload and computational resources.

Some embodiments of the present principles include physics-guided embedding. In such embodiments, physics properties of the respective sensors and/or the sensor data (i.e., imaged objects) provide additional structure and constraints into the embedding space through encoded domain knowledge. The constraints in the embedding space provide additional expandability and verification of the results, by comparing results to known physics properties including, but not limited to, surface reflection of objects, temperature, and humidity. For example, from the perspective of physically plausible compositionality, the embedding of a mixture of two materials (e.g., grass as foreground and soil as background) will ideally lie in between the embeddings of these two materials. However, from the perspective of physically plausible properties, the embeddings of a material with different environmental temperature or humidity not only cluster in the close neighborhood but also form a trajectory that consistently evolves as temperature or humidity changes.

Some embodiments of the present principles include late-stage fusion. Compared to traditional early-stage raw data fusion, fusing feature data in a common embedding space in accordance with the present principles increases the robustness to spoof data from single modalities.

Embodiments of the present principles enable the use of a single model during inference, after training. The trained multi-modal common embedding space enables the use of only one sensor model. That is, in some embodiments, in a scenario where additional sensor information may not be available (e.g., for a new place), embodiments of the present principles can implement a Generative Adversarial Network (GAN) and/or variational autoencoders to learn differences across sensors and later augment available sensor data.

In other embodiments, a model simulator can be utilized to learn differences across data modalities and augment a trained network when there is limited data for a new data model.

FIG. 1 depicts a high-level block diagram of a sensor data fusion system 100 for combining sensor data from multiple different types of sensors using multimodal embedding in accordance with an embodiment of the present principles. The sensor data fusion system 100 of FIG. 1 illustratively comprises a feature extraction module 110, an embedding module 120, a fusion module 130, and an inference module 135. In some embodiments and as specifically depicted in the sensor data fusion system 100 of FIG. 1, a sensor data fusion system of the present principles can further comprise an optional generator module 140 and optional discriminator module 150, the function of which will be described further below. Although the embodiment of the sensor data fusion system 100 of FIG. 1 illustratively comprises a single feature extraction module 110, in some embodiments, a sensor data fusion system of the present principles can include more than one feature extraction module and in some embodiments can include at least one feature extraction module for each different sensor type (modality) and/or each different type of sensor data (modality) to be combined.

As depicted in FIG. 1, embodiments of a sensor data fusion system in accordance with the present principles, such as the sensor data fusion system 100 of FIG. 1, can be implemented in a computing device 900 (described in greater detail with respect to FIG. 9) in accordance with the present principles. That is, in some embodiments, sensor data can be communicated to the sensor data fusion system 100 using the computing device 900 via, for example, any input/output means associated with the computing device 900. In addition, images and data that can be used to train an embedding space in accordance with the present principles and any queries to be processed can be accessed by the sensor data fusion system 100 from the computing device 900 using any input/output means associated with the computing device 900. Results of a sensor data fusion system in accordance with the present principles can be presented to a user using an output device of the computing device 900, such as a display, a printer or any other form of output device (described in greater detail with respect to FIG. 9).

In the sensor data fusion system 100 of FIG. 1, images of a scene captured by at least two different types (e.g., different modalities) of sensors are communicated to a respective one of the at least one feature extraction module 110. In some embodiments, at the at least one feature extraction module 110, neural networks can be applied to the respective captured images of the at least two different types of sensors to extract the visual features of the images of the at least two different types of sensors. Such neural networks can include, but are not limited to, convolutional neural networks (CNNs), recurrent neural networks (RNNs), transformers, and substantially any neural network that can extract vector representations for features of the sensor data. In some embodiments, model (sensor) specific neural networks can be used to determine respective image features of the images from the at least two different types of sensors. The extracted image features from the at least one feature extraction module 110 are communicated to respective ones of the at least one embedding module 120. In some embodiments, at each of the at least one embedding module 120, the extracted image features of the at least two different types of sensors are embedded/projected into a common embedding space.

In some embodiments, a common embedding space in accordance with the present principles can be created using Word2vec. Word2vec is a machine learning process/model that produces word embedding vectors, where words are associated with a number to produce a numerical essence of the word. In some embodiments, respective word vectors for the words representative of text interacted with by a user(s) can be created. Word2vec produces word embeddings (arrays of numbers) where the words (i.e., representative of text) with similar meanings or context are physically close to each other in the embedded space. The numbers are typically arranged in arrays that allow mathematical processes to be performed on the numbers. Quantifying words as a series of numbers allows machine learning to find anew word similar to the other two words based on numbers and data properties of each word based on a model. The words can then be graphed and compared to words based on mathematical properties. The distance between graphed words can be described as vectors or a distance with a direction. Moving from one graphed word to another graphed word in space allows one to represent/graph the idea of word relationships which are hard coded "word vectors." In such embodiments, a convolutional neural network (CNN) can be used to create an embedding space in accordance with the present principles.

In some embodiments, a common embedding space in accordance with the present principles can be pre-trained using an embedding model referred to as DeViSE (see, A. Frome, G. Corrado, and J. Shlens, "DeViSE: A deep visual-semantic embedding model," Adv. Neural . . . , pp. 1-11, 2013). Specifically, an image embedding is trained that maps every image to a word embedding space. This can be achieved using a convolutional neural network attaching a fully connected layer to transform. To avoid a sparse sampling of the embedding space during pre-training, additional data from external sources can be implemented to train the semantic embedding space to produce a dense object class sampling in the semantic embedding space. In some embodiments, the word embeddings are not learned but are initialized using GloVE (see, J. Pennington, R. Socher, and C. D. Manning, "GloVe: Global Vectors for Word Representation.").

In some embodiments, an embedding space in accordance with the present principles can be further trained using data captured by the different types (modalities) of sensors. That is, features are extracted from images captured by the at least two different types (modalities) of sensors by at least one respective feature extraction module and are embedded into the common embedding space by at least one embedding module. Because the features of the images from the different types of sensors are embedded in a common embedding space, a relationship between data captured by the different types of sensors can be determined (as will be described in greater detail below).

That is, in some embodiments, to more specifically train a common embedding space in accordance with the present principles, sensor data have at least a first modality and a second modality can be received by a feature extraction module of a sensor data fusion system of the present principles, such as the feature extraction module 110 of the sensor data fusion system 100 of FIG. 1. For each of a plurality of the captured sensor data having a first modality of the at least two modalities, respective first modality sensor-data vector representations of the features of the sensor data having the first modality are created. Similarly, for each of a plurality of the captured sensor data having the second modality of the at least two modalities, respective second modality sensor-data vector representations of the features of the sensor data having the second modality are created. The first modality sensor-data vector representations and the second modality sensor-data vector representations can then be embedded in a common embedding space such that embedded modality vectors that are related, across modalities, are closer together in the common embedding space than unrelated modality vectors. The embedded first modality sensor-data vector representations and the second modality vector representations can then be combined into a resultant vector to train the common embedding space.

Once a common embedding space is trained in accordance with embodiments of the present principles and as described above, the trained, common embedding space can be used to identify at least one object depicted by captured sensor data having at least two modalities. For example, in some embodiments, for each of a plurality of sensor data having a first modality, respective first modality sensor-data vector representations of the features of the sensor data having the first modality are created. Similarly, for each of a plurality of the sensor data having a second modality of the at least two modalities, respective second modality sensor-data vector representations of the features of the sensor data having the second modality are created. The first modality sensor-data vector representations and the second modality sensor-data vector representations can then be projected in the trained common embedding space such that embedded modality vectors that are related, across modalities, are closer together in the common embedding space than unrelated modality vectors. The projected first modality sensor-data vector representations and the second modality vector representations can then be combined into a resultant vector. In accordance with the present principles, a similarity can be determined between the combined, resultant vectors and respective embedded vector representations of features of objects in the trained, common embedding space using a distance function to identify at least one object depicted by the sensor data having the at least two modalities.

Figure 2:
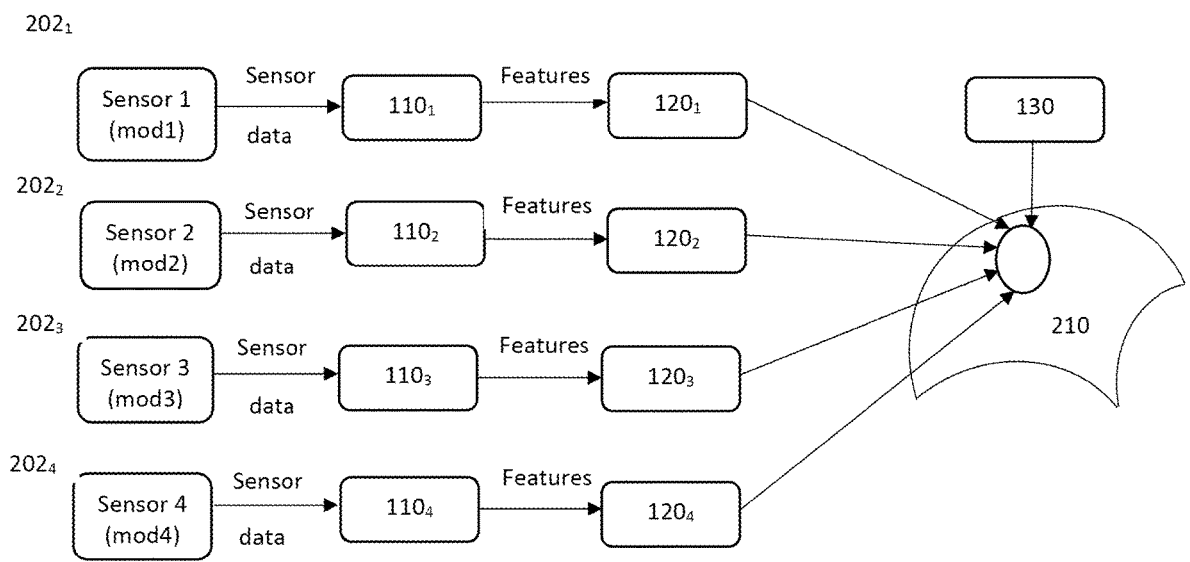
FIG. 2 depicts a high-level functional diagram of the functionality of a sensor data fusion system of the present principles, such as the sensor data fusion system of FIG. 1 in accordance with an embodiment of the present principles.

FIG. 2 depicts a high-level functional diagram of the functionality of a sensor data fusion system of the present principles, such as the sensor data fusion system 100 of FIG. 1 in accordance with an embodiment of the present principles. Illustratively in the embodiment of FIG. 2, four (4) different type of sensors $202_1$, $202_2$, $202_3$, $202_4$ (collectively sensors 202) having different modalities (mod) capture images of a same scene. In some embodiments, such as the embodiment of FIG. 2, the four (4) sensors can include but are not limited to sensors such as Radar sensors, RGB sensors, electro-optic (EO) sensors, satellite image sensors, InfraRed sensors, etc. In the embodiment of FIG. 2, the data captured by each of the four (4) different type of sensors $202_1$, $202_2$, $202_3$, $202_4$ is communicated to a respective one of four feature extraction modules $110_1$, $110_2$, $110_3$, $110_4$ (collectively feature extraction modules 110). As described above, at the feature extraction modules 110, image features of the images captured by the sensors 202 are extracted, for example in some embodiments, using neural networks, such as model-specific CNNs.

For example, in some embodiments a first sensor type can include a satellite sensor collecting satellite imagery of a scene. In such embodiments, image features of the data captured by the satellite sensor can be extracted by a respective feature extraction module configured to extract image features of satellite imagery using CNNs trained to extract image features of satellite imagery. In addition, a second type sensor can include an electro-optical (EO) sensor collecting images of, for example, the same scene. In such embodiments, image features of the data captured by the EO sensor can be extracted by a respective feature extraction module configured to extract image features of EO data using CNNs trained to extract image features from EO data. Even further, a third type sensor can include an infrared (IR) sensor collecting IR images of, for example, the same scene. In such embodiments, image features of the data captured by the IR sensor can be extracted by a respective feature extraction module configured to extract image features of IR data using CNNs trained to extract image features from IR data. The extracted satellite, EO, and IR image features can then be projected/embedded into a common embedding space, by, for example, at least one embedding module of the present principles, as described above.

That is, and as depicted in the embodiment of FIG. 2, the extracted image features of each of the feature extraction modules 110 are communicated to a respective one of four embedding modules $120_1$, $120_2$, $120_3$, $120_4$ (collectively embedding modules 120). At the embedding modules 120, the extracted features of the data from the different types of sensors 202 are projected/embedded into the common embedding space 210. In some embodiments, the image embedding modules 120 determine respective feature vector representations of the image data of the different types of sensors for projecting/embedding the image data into the common embedding space 210. That is, image features received by the embedding modules 120 can be projected/embedded in the common embedding space 210 by, in some embodiments, projecting/embedding word vectors representative of the features of the image data captured by the different types of sensors 202 into the embedding space 210 via, in some embodiments, a linear projection. In some embodiments in accordance with the present principles, the embedding modules 120 can include a deep image encoder (not shown) implementing a neural network, in some embodiments a convolutional neural network (CNN) with fully connected (FC) layers, to process the image data for projecting/embedding the image data into the common embedding space. In some other embodiments, alternatively or in addition, the neural network can include a transformer.

Referring back to FIGS. 1 and 2, in some embodiments the embedded feature vectors of the data from the different types of sensors can be fused in the embedding space by the fusion module 130. For example, in some embodiments and as depicted in the embodiment of FIG. 2, the fusion module 130 combines respective embedded feature vectors of the extracted features of the of data captured by the different types of sensors 202 for each of the modalities into a combined feature vector representation of respective features of a common scene captured by the different types of sensors 202. In some embodiments of the present principles, the fusion module 130 incorporates a late fusion technique, which includes first, a determination of feature vectors of image data of the different types of sensors, projecting/embedding the determined feature vectors in a common embedding space, and then a combination of the projected/embedded feature vectors of image data of the different types of sensors for each of multiple modalities. Such a late fusion/combination in accordance with the present principles provides more discriminative results than early fusion techniques.

The combined feature vectors of the image data of the different types of sensors for each of multiple modalities can be used for detection of targets/objects in sensor data in accordance with some embodiments of the present principles. For example, and referring back to FIG. 1, in some embodiments, the inference module 135 is configured to determine a similarity between a combination of projected feature vector representations of image data of the different types of sensors for each of multiple modalities, combined as described above, and respective embedded feature vector representations of image data in the previously trained common embedding space. In some embodiments, an inference module of the present principles, such as the inference module 135 of the sensor data fusion system 100 of FIG. 1, can implement a distance function to determine a similarity between the combination of the projected feature vector representations and the respective embedded feature vector representations in the previously trained common embedding space to identify at least one object depicted by the sensor data having multiple modalities. In some embodiments, the distance function can include at least one of a cosine function, a Euclidean function, and/or a Lagrangian point 1, L1, function, and the like.

In some embodiments of a sensor data fusion system of the present principles, the feature extraction of the present principle, performed by, for example, the feature extraction modules 110 can include physics guided feature extraction. For example, in some embodiments, features extracted from sensor data captured by sensors of a specific type can be constrained/limited/guided according to physics properties of the sensor and/or sensor data modality. That is, in some embodiments feature extraction can be constrained/guided by incorporating physics equations/properties and principles into learning feature extraction using machine learning, that ensures physical properties of each mode are recoverable from their low-dimensional representations to facilitate learning with fewer examples while maintaining generalization performance. For example, in some embodiments neural networks, such as CNNs, trained to perform feature extraction according to physics equations/physics properties of a specific type of sensor and/or sensor data modality can be implemented by a feature extraction module of the present principles to extract features of data captured by sensors of that specific type. As such and in accordance with the present principles, outlier data captured by sensors can be ignored. For example, in some embodiments, for each data model, an encoder and decoder can be implemented that deconstructs features and reconstructs features using incorporated physics properties/equations. As such, if the reconstructed features have similar features to the original data, the features can be considered to preserve the physics properties of the original data.

Alternatively or in addition, in some embodiments of a sensor data fusion system of the present principles, the fusion of the present principle, performed by, for example, the fusion module 130 of the present principles can include attention-based mode fusion. For example, in some embodiments during training of a common embedding space as described above, individual contributions of the different sensors 202 to resulting sensor data combinations (i.e., multimodal embeddings) are noted by, in some embodiments, the fusion module 130. As such, during application or use of a sensor data fusion system of the present principles, the fusion module 130 can weigh a respective contribution of each of the different sensors 202 to achieve a desired combined signal. In some embodiments, attention can be based on sensor modalities instead of individual sensors. For example, in some embodiments, attention to the contribution of sensor modalities to a combined signal instead of a contribution of individual sensors themselves can be taken into account when weighing data captured by different types of sensor for achieving a desired combined signal.

In some embodiments, the attention-based fusion of the present principles can include the fusion of multimodal information using attention between modalities in a neural network. Such embodiments are able to dynamically adjust the relative importance of each modality to generate better data combinations. In some embodiments, benefits of attention-based multimodal fusion of the present principles can include: (1) the modalities that contribute more to a data combination can dynamically receive a stronger weight, and (2) the network can detect interference (e.g., noise) and other sources of uncertainty in each modality and dynamically down-weight the modalities that are less certain.

In some embodiments of a sensor data fusion system of the present principles, the projection/embedding of the sensor data into a common embedding space in accordance with the present principles, by for example the embedding module 120, can be constrained/guided by physics properties of the sensors and/or associated data. For example, in some embodiments, a common embedding space can be trained using physics equations and principles of the sensors and associated data that provide additional structure and constraints into the embedding space. Subsequently, sensor data can be projected/embedded into the common embedding space in accordance with the respective physics properties of the sensors and associated data in the common embedding space. Adding physics properties into the embedding space during training in accordance with embodiments of the present principles improves the capabilities of the embedding space, for example, (1) reducing training data, (2) providing better explainability and prediction (detection/classification) of a new object during inference based on its physics properties.

Figure 3A:
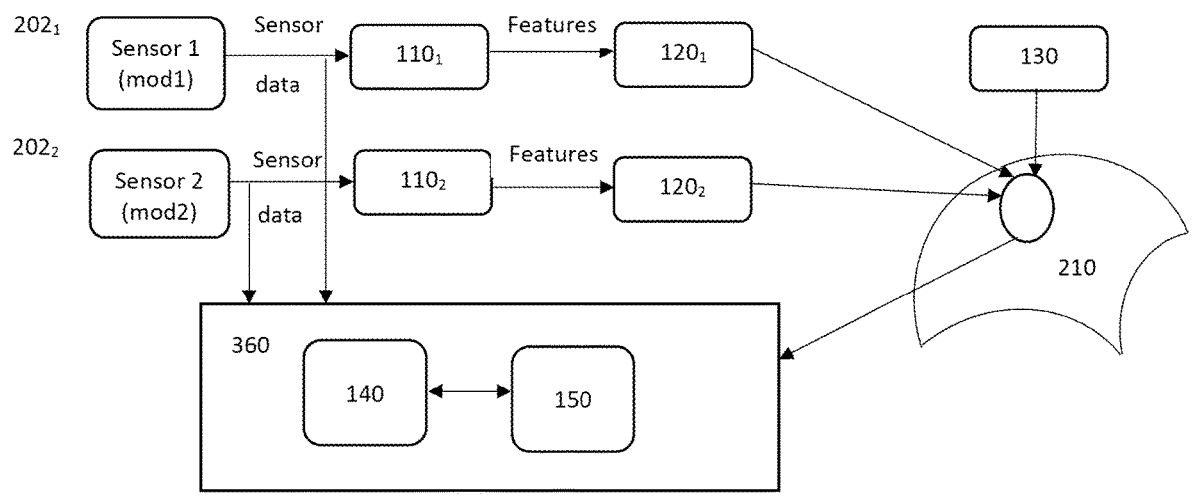
FIG. 3A depicts a high-level functional diagram of the operation of the optional generator module and the optional discriminator module of a sensor data fusion system in accordance with an embodiment of the present principles.

FIG. 3A depicts a high-level functional diagram of the functionality of the optional generator module 140 and the optional discriminator module 150 of a sensor data fusion system, such as the sensor data fusion system 100 of FIG. 1, in accordance with an embodiment of the present principles. In the embodiment of FIG. 3A, during the training of the common embedding space 210 using, illustratively, the data from two different sensors (sensor modalities), Sensor 1, $202_1$, and Sensor 2, $202_2$, capturing images of a common scene, a generative adversarial (GAN) network 360 comprising the generator module 140 and the discriminator module 150, can be implemented to learn the sensor data characteristics and sensor response of at least one of the sensors when capturing data, illustratively in FIG. 3A, Sensor 2. For example, in some embodiments the GAN network 360 can learn a difference between the data of the Sensor 1 when capturing a scene and the data of the Sensor 2 when capturing the same scene.

Figure 3B:
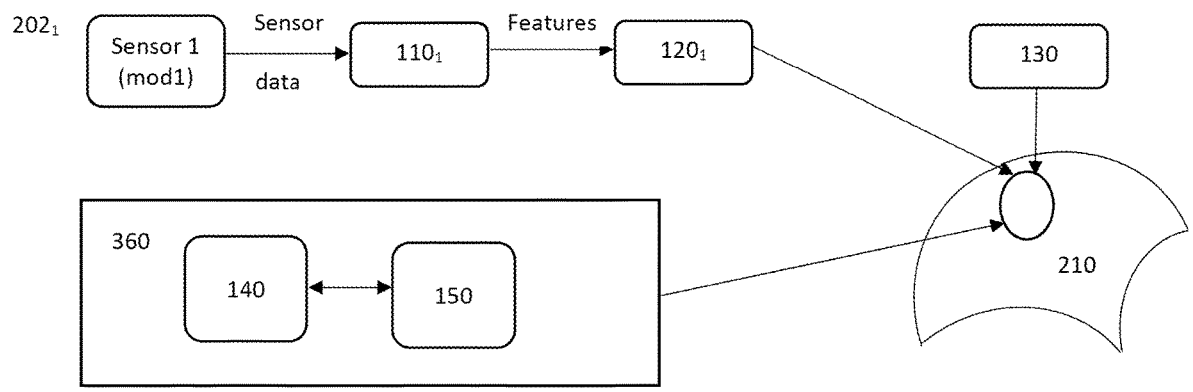
FIG. 3B depicts a high-level functional diagram of a simulation of the data capture of a learned sensor, such as Sensor 2 of FIG. 3A, in a sensor data fusion system in accordance with an embodiment of the present principles.

FIG. 3B depicts a high-level functional diagram of a simulation of the data capture of a learned sensor, such as Sensor 2, $202_2$, of FIG. 3A, in a sensor data fusion system, such as the sensor data fusion system 100 of FIG. 1 in accordance with an embodiment of the present principles. As depicted in the embodiment of FIG. 3B, during an application/implementation in which a learned sensor, for example Sensor 2, $202_2$, of FIG. 3A, is not available to capture data of a scene, the data capture of the learned sensor, such as Sensor 2 of FIG. 3A, can be emulated by a GAN network of the present principles, such as the GAN network 360 of FIG. 3A. That is, as described above with respect to FIG. 3A, during training, the GAN network 360 determines a difference between the data of a scene captured by the Sensor 1, $202_1$, and the data of the scene captured by the Sensor 2, $202_2$. As such, in the embodiment of FIG. 3B, the data of the scene captured by Sensor 1, $202_1$, can be used by the GAN network 360 to emulate data of the scene as would have been captured by the Sensor 2, $202_2$. That is, in the embodiment of FIG. 3B, the GAN network 360 uses the determined difference between the data captured of a scene by Sensor 1, $202_1$, and Sensor 2, $202_2$, during training to emulate data as would have been captured by Sensor 2, $202_2$, of a same scene as captured by Sensor 1, $202_1$. As depicted in FIG. 3B, the data captured by the Sensor 1, $202_1$, and the emulated data of Sensor 2, $202_2$, can be combined in the common embedding space 210 as previously described above.

As described above, embodiments of the present principles provide an end-to-end pipeline system that, during training, fuses multi-sensor (i.e., multi-modal) data in a common embedding space by directly optimizing target metrics and learning the contribution of each sensor (mode) to the results. As such, even during applications/implementations in which a learned sensor is not available to capture data, the data capture of the learned sensor can be emulated as described above. That is, embodiments of the present principles enable the use of a single sensor model to emulate data captured by a plurality of different sensors.

In some embodiments of a sensor data fusion system of the present principles, such as the sensor data fusion system 100 of FIG. 1, the generator 140 and the discriminator 150 of the GAN network 360 comprise an adversarial relationship. More specifically, in some embodiments emulated data of learned sensors created by the generator 140 are reviewed by the discriminator 150, which determines if the generator 140 has created data that adequately reflects data from the learned sensor. The back and forth between the creation of the data by the generator 140 and the review of the data by the discriminator 150 continues until the created data is acceptable to the discriminator 150 as data that would be produced by a learned sensor. Although embodiments of the present principles are described as implementing a GAN network to learn a model of a sensor for future use when the learned sensor is not available, alternatively or in addition, in some embodiments of the present principles, an encoder/decoder pair, such as a variational autoencoder (not shown), can be implemented to learn a model of a sensor for future use when the learned sensor is not available as described above with respect to the GAN network 360. That is, in some embodiments, a Variational Autoencoder can merge high-level representations of several heterogeneous sensors (data sources) into a single latent representation by learning to reconstruct the input data from the common homogeneous representation and, as such learn respective models of the contributing sensors. As such, in later applications when a sensor may not be available, the sensor model can be used to emulate a contribution of the unavailable sensor to data captured by available sensors.

Figure 4A:
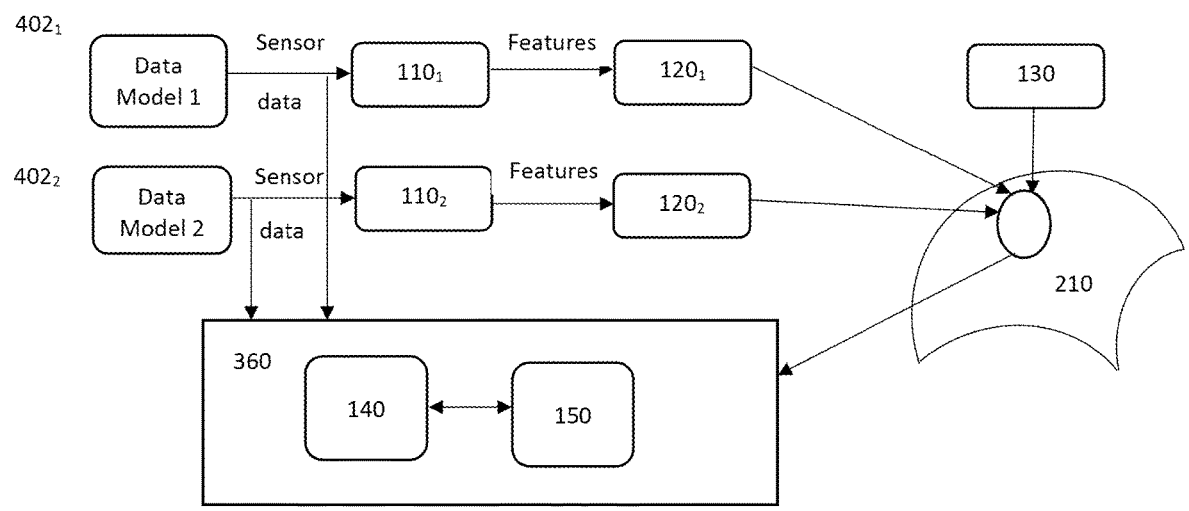
FIG. 4A depicts a high-level functional diagram of the operation of the optional generator module and the optional discriminator module of a sensor data fusion system in accordance with an alternate embodiment of the present principles.

FIG. 4A depicts a high-level functional diagram of the operation of the optional generator module 140 and the optional discriminator module 150 of a sensor data fusion system, such as the sensor data fusion system 100 of FIG. 1, in which different data modalities are combined in accordance with an alternate embodiment of the present principles. In the embodiment of FIG. 4A, during the training of the common embedding space 210 using, illustratively, data models of two different modalities, Data Model 1, $402_1$, and Data Model 2, $402_2$, the generator module 140 and the discriminator module 150, can be implemented to learn and simulate the characteristics of at least one data model, illustratively in FIG. 4A, Data Model 2, $402_2$. For example, in some embodiments such as the embodiment of FIG. 4A, the generator module 140 and the discriminator 150 can determine differences between the different data modalities, Data Model 1, $402_1$, and Data Model 2, $402_2$.

Figure 4B:
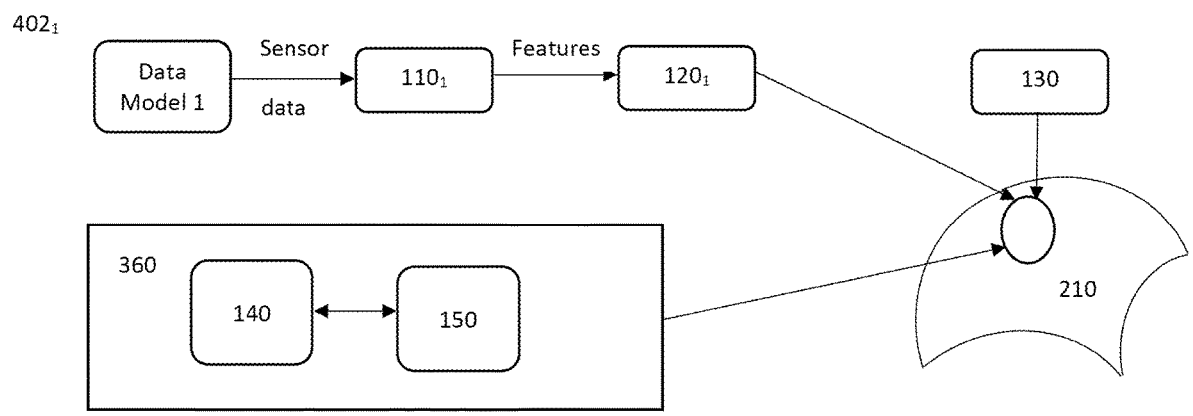
FIG. 4B depicts a high-level functional diagram of a simulation of the characteristics of a data modality, such as Data Model 2 of FIG. 4A, in a sensor data fusion system in accordance with an embodiment of the present principles.

FIG. 4B depicts a functional diagram of a simulation of the characteristics of a data modality, such as Data Model 2, $402_2$, of FIG. 4A, in a sensor data fusion system of the present principles, such as the sensor data fusion system 100 of FIG. 1, in accordance with an embodiment of the present principles. As depicted in the embodiment of FIG. 4B, during an application/implementation in which a learned data modality, for example Data Model 2, $402_2$, of FIG. 4A, is not available, the characteristics of the learned data modality, such as Data Model 2, $402_2$, of FIG. 4A, can be simulated by the generator 140 and the discriminator 150. That is, as described above with respect to FIG. 4A, during training, the generator 140 and the discriminator 150 can determine differences between the data modalities, Data Model 1, $402_1$, and Data Model 2, $402_2$. As such, in the embodiment of FIG. 4B, the available data modality, Data Model 1, $402_1$, can be used by the generator 140 and the discriminator 150 to simulate the second data modality, Data Model 2, $402_2$. That is, in the embodiment of FIG. 4B, the generator 140 and the discriminator 150 use the determined difference between the data modalities, Data Model 1, $402_1$, and Data Model 2, $402_2$, determined during training, to simulate the second data modality, Data Model 2, $402_2$. As depicted in FIG. 4B, the Data Model 1, $402_1$, and the simulated Data Model 2, $402_2$, can be projected/embedded into the common embedding space 210 as previously described above.

As described above, in some embodiments of a sensor data fusion system of the present principles, such as the sensor data fusion system 100 of FIG. 1, the generator 140 and the discriminator 150 can comprise an adversarial relationship. More specifically, in some embodiments simulated Data Models/modalities created by the generator 140 are reviewed by the discriminator 150, which determines if the generator 140 has created data that adequately simulates the Data Model. The back and forth between the creation of the data by the generator 140 and the review of the data by the discriminator 150 continues until the created data is acceptable to the discriminator 150 as data that simulates a missing Data Model.

Figure 5:
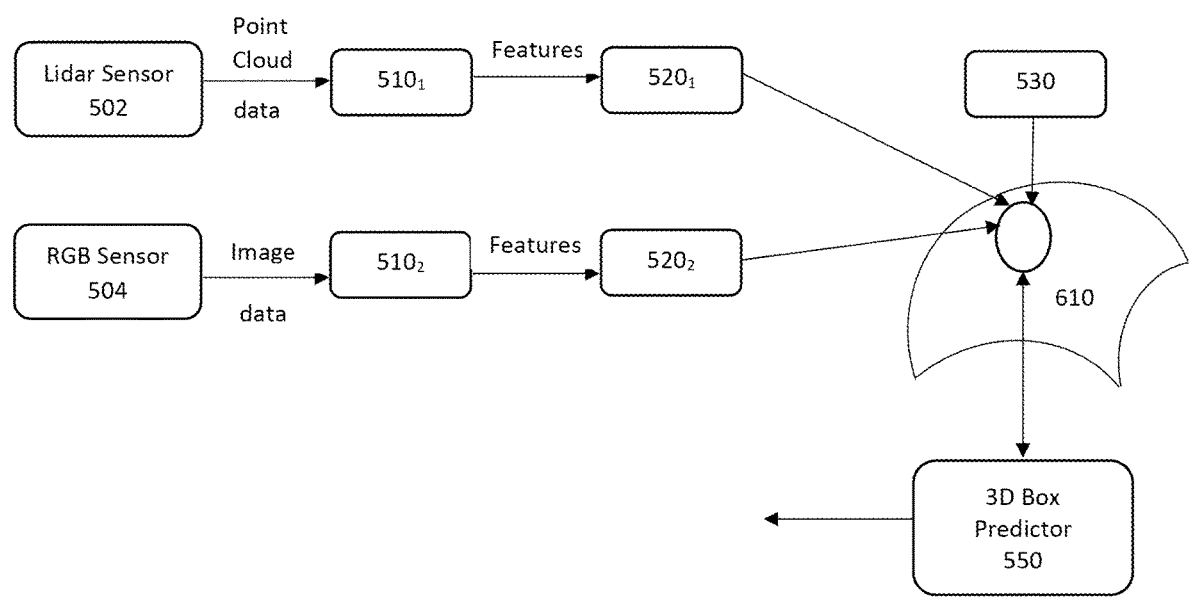
FIG. 5 depicts a high-level functional diagram of a sensor data fusion system of the present principles that can be implemented for 3D target/object detection in accordance with an embodiment of the present principles.

In one application/implementation, a sensor data fusion system of the present principles, such as the sensor data fusion system 100 of FIG. 1, can be implemented for 3D target/object detection. For example, FIG. 5 depicts a high-level functional diagram of a sensor data fusion system of the present principles, such as the sensor data fusion system 100 of FIG. 1, that can be implemented for 3D target/object detection in accordance with an embodiment of the present principles. In the embodiment of FIG. 5, point cloud data of a scene captured, illustratively, by a Lidar sensor 502, can be projected/embedded into a common embedding space 610. That is, in some embodiments, image features of the point cloud data can be extracted using a model-specific CNN using a respective feature extraction module $510_1$. The extracted image features of the point cloud data are communicated to an embedding module $520_1$. As described above, at the embedding module $520_1$, the extracted image features of the point cloud data are projected/embedded into the common embedding space 610.

In the embodiment of FIG. 5, image data of the scene captured, illustratively, by an RGB sensor 504, can be projected/embedded into the common embedding space 610. That is, in some embodiments, image features of the image data 504 can be extracted using a model-specific CNN using a respective feature extraction module $510_2$. The extracted image features of the image data are communicated to the embedding module $520_2$. As described above, at the embedding module $520_2$, the extracted image features of the image data are projected/embedded into the common embedding space 610.

As described above and depicted in FIG. 5, respective vector representations of the projected/embedded point cloud data of the Lidar sensor and the vector representations of the projected/embedded image data of the RGB sensor are combined (e.g., fused) into a joint representation illustratively by the fusion module 530. From the joint representations, 3D targets/objects can be determined. For example in the embodiment of FIG. 5, a 3D box predictor 550 can used to determine 3D targets/objects in a captured scene. In some embodiments, the 3D box predictor 550 predicts a size of the object, a center position and an orientation of the object and specifically recovers boxes with 3D center position (x, y, z), and 3D size (w, h, l) also, recovering rotation around axis (yaw, pitch, roll). In some embodiments of the present principles, however, such as in autonomous driving datasets, roll and pitch can be assumed to be zero for simplicity.

Alternatively or in addition, in some embodiments the 3D box predictor 550 of FIG. 5 can determine 2D bounding boxes from the 2D image data captured by, for example an RGB sensor and using the point cloud data captured by, for example a Lidar sensor, can determine 3D bounding boxes for targets/objects of captured scenes. In such embodiments, powerful neural network based 2D image-based object detectors can be used to provide 2D bounding boxes, which can help reduce search space for 3D bounding box detection. In such embodiments, the common embedding space 610 can be trained using both the image data from, for example an RGB sensor, and the point cloud data from, for example a Lidar sensor, such that if image data is not available during application/implementation time, the image data can be emulated as described above with respect to at least FIG. 3B and FIG. 4B.

Figure 6:
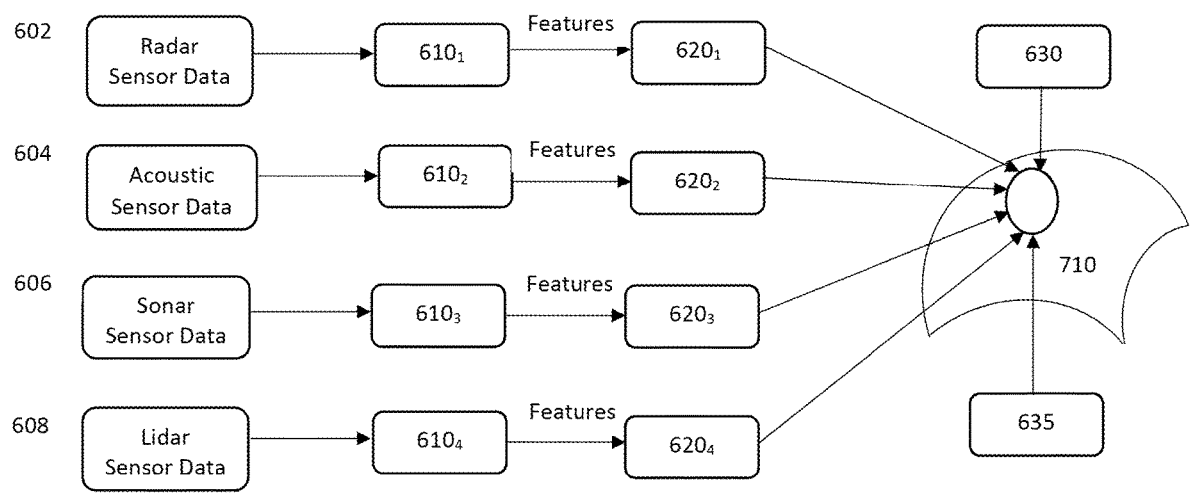
FIG. 6 depicts a high-level functional block diagram of a sensor data fusion system of the present principles that can be implemented for underwater target/object sensing applications in accordance with an embodiment of the present principles.

FIG. 6 depicts a high-level functional block diagram of a sensor data fusion system of the present principles, such as the sensor data fusion system 100 of FIG. 1, that can be implemented for underwater target/object sensing applications in accordance with an embodiment of the present principles. For example, in the sensor data fusion system of FIG. 6 data from different sensor modalities, sources, and different levels of fidelities: acoustic sensors (multi-static sonars), radar sensors, cameras, LiDAR sensors, above water sensors, active sonars, and any future sensors can be used to generate a combined signal for underwater target/object sensing applications. Specifically, in the illustrated embodiment of FIG. 6, sensor data 602 from a Radar sensor is received and features of the Radar sensor data 602 are extracted using, for example, a respective feature extraction module $610_1$ of the present principles which can include a sensor-specific CNN pretrained to extract features from Radar sensor data. The extracted features of the Radar sensor data are projected/embedded into a common embedding space 710 by, for example, a respective embedding module $620_1$ of the present principles. As described above, the extracted features of the Radar sensor data projected/embedded into the common embedding space 710 can be used to respectively assist in identifying an object in sensor data of a common scene and/or to train the common embedding space 710.

Similarly and as depicted in FIG. 6, sensor data 604 from an Acoustic sensor is received and features of the Acoustic sensor data 604 are extracted using, for example, a feature extraction module $610_2$ of the present principles which can include a sensor-specific CNN pretrained to extract features from Acoustic sensor data. The extracted features of the Acoustic sensor data are projected/embedded into the common embedding space 710 by, for example an embedding module $620_2$ of the present principles. As described above, the extracted features of the Acoustic sensor data projected/embedded into the common embedding space 710 can be used to respectively assist in identifying an object in sensor data of a common scene and/or to train the common embedding space 710.

As further depicted in FIG. 6, sensor data 606 from a Sonar sensor is received and features of the Sonar sensor data 606 are extracted using, for example, a feature extraction module of the present principles $610_3$ which can include a sensor-specific CNN pretrained to extract features from Sonar sensor data. The extracted features of the Sonar sensor data are projected/embedded into the common embedding space 710 by, for example an embedding module $620_3$ of the present principles. As described above, the extracted features of the Sonar sensor data projected/embedded into the common embedding space 710 can be used to respectively assist in identifying an object in sensor data of a common scene and/or to train the common embedding space 710.

In the underwater target/object sensing sensor data fusion system of FIG. 6, sensor data 608 from a Lidar sensor is received and features of the Lidar sensor data 608 are extracted using, for example, a feature extraction module $610_4$ of the present principles which can include a sensor-specific CNN pretrained to extract features from Lidar sensor data. The extracted features of the Lidar sensor data are projected/embedded into the common embedding space 710 by, for example an embedding module $620_4$ of the present principles. As described above, the extracted features of the Lidar sensor data projected/embedded into the common embedding space 710 can be used to respectively assist in identifying an object in sensor data of a common scene and/or to train the common embedding space 710.

The projected/embedded features of each of the different modality sensors (e.g., the Radar sensor, the Acoustic sensor, the Sonar sensor, and the Lidar sensor) can be combined in the common embedding space 710 by, for example a fusion module 630 of the present principles.

In the embodiments of the present principles, such as the embodiment of FIG. 6, the combined projected sensor data can be used for detection of targets/objects in an underwater application in accordance with the present principles. For example, and as described above, in some embodiments, an inference module 635 of the present principles, such as the inference module 135 of the sensor data fusion system 100 of FIG. 1, is configured to determine a similarity between the combined, projected vector representations of the image data of the sensors having different modalities and respective embedded vector representations of features of image data embedded in the common embedding space using a distance function to identify at least one object depicted by the image data of the sensors having the different modalities.

Figure 7:
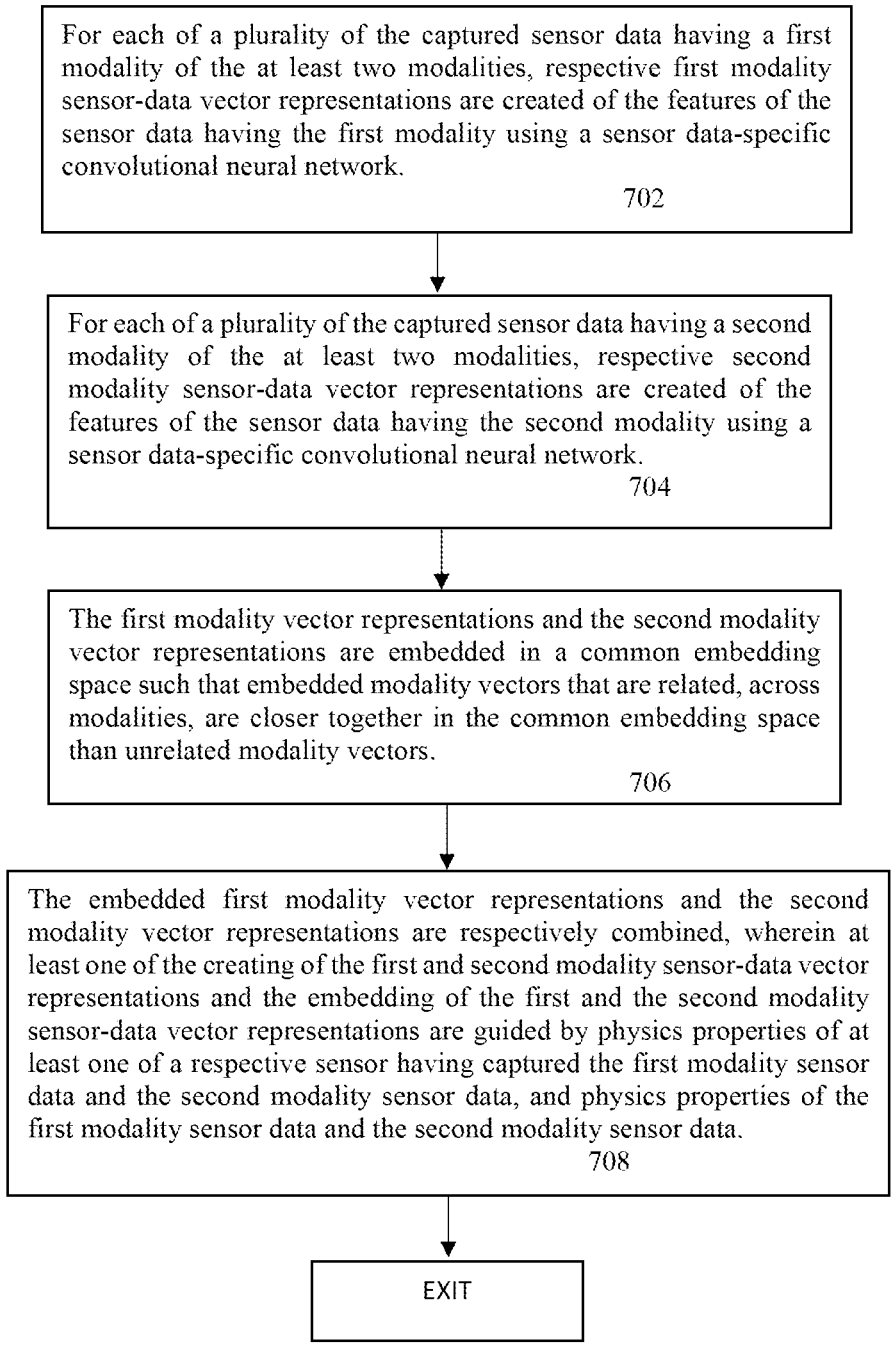
FIG. 7 depicts a flow diagram of a method for training a common embedding space for combining sensor data captured of a common scene having at least two modalities in accordance with an embodiment of the present principles.

FIG. 7 depicts a flow diagram of a method for training a common embedding space for combining sensor data captured of a common scene having at least two modalities in accordance with an embodiment of the present principles. The method 700 begins at 702 during which, for each of a plurality of the captured sensor data having a first modality of the at least two modalities, respective first modality sensor-data vector representations are created of the features of the sensor data having the first modality using a sensor data-specific neural network. The method 700 can proceed to 704.

At 704, for each of a plurality of the captured sensor data having a second modality of the at least two modalities, respective second modality sensor-data vector representations are created of the features of the sensor data having the second modality using a sensor data-specific neural network. The method 700 can proceed to 706.

At 706, the first modality vector representations and the second modality vector representations are embedded in a common embedding space such that embedded modality vectors that are related, across modalities, are closer together in the common embedding space than unrelated modality vectors. The method 700 can proceed to 708.

At 708, the embedded first modality vector representations and the second modality vector representations are respectively combined. In some embodiments of the present principles, the first modality vector representations and the second modality vector representations are respectively combined into respective, combined vector representations. The method 700 can be exited.

In some embodiments of a method in accordance with the present principles, such as the method 700 of FIG. 7, at least one of the creating of the first and second modality vector representations and the embedding of the first and second modality vector representations are constrained/guided by physics properties of at least one of a respective sensor having captured the first modality sensor data and the second modality sensor data, and physics properties of the first modality sensor data and the second modality sensor data.

In some embodiments of a method in accordance with the present principles, such as the method 700 of FIG. 7, a difference between sensor data having a first modality of the at least two modalities and at least sensor data having a second modality of the at least two modalities is determined such that, in later applications, if sensor data of the first modality or the second modality is not available, the missing sensor data can be emulated from the sensor data of the first modality or the second modality that is available.

Figure 8:
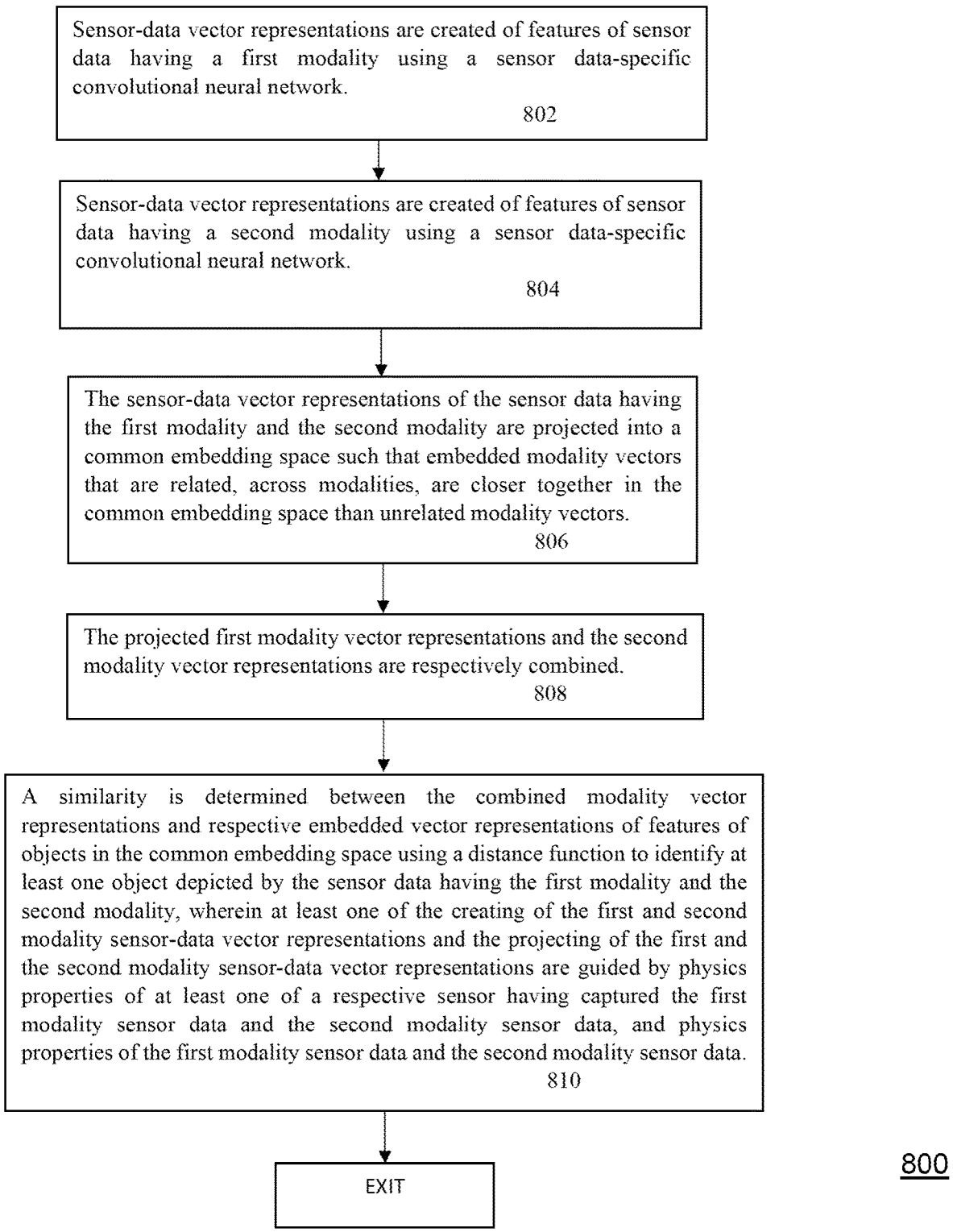
FIG. 8 depicts a flow diagram of a method for object detection using a common embedding space trained in accordance with an embodiment of the present principles.

As described above, once the common embedding space is created as described above, the created embedding space can be implemented for different purposes, including but not limited to, target/object detection, target/object recognition, structure classification and the like. For example, FIG. 8 depicts a flow diagram of a method for object detection in sensor data captured using sensors having at least two modalities using a common embedding space trained in accordance with an embodiment of the present principles. The method 800 begins at 802 during which, sensor-data vector representations are created of features of sensor data having a first modality using a sensor data-specific neural network. The method 800 can proceed to 804.

At 804, sensor-data vector representations are created of features of sensor data having a second modality using a sensor data-specific neural network. The method 800 can proceed to 806.

At 806, the sensor-data vector representations of the sensor data having the first modality and the second modality are projected into a common embedding space such that embedded modality vectors that are related, across modalities, are closer together in the common embedding space than unrelated modality vectors. The method 800 can proceed to 808.

At 808, the projected first modality vector representations and the second modality vector representations are respectively combined. The method 800 can proceed to 810.

At 810, a similarity is determined between the combined modality vector representations and respective embedded vector representations of features of objects in the common embedding space using a distance function to identify at least one object depicted by the sensor data having the first modality and the second modality. The method 800 can be exited.

In some embodiments of a method in accordance with the present principles, such as the method 800 of FIG. 8, at least one of the creating of the first and second modality vector representations and the embedding of the first and second modality vector representations are constrained/guided by physics properties of at least one of a respective sensor having captured the first modality sensor data and the second modality sensor data, and physics properties of the first modality sensor data and the second modality sensor data.

In some embodiments of a method in accordance with the present principles, such as the method 800 of FIG. 8, in instances in which one of the sensor data of the first modality or the second modality is not available, a previously learned difference between the sensor data of the first modality and the second modality (as previously described) can be used along with the available sensor modality data to emulate the missing data before projecting the sensor data having the first modality and the second modality into the common embedding space.

Embodiments of the present principles use a common embedding space, trained as described above, to capture and learn as much information, such as 3D information, of a scene to, for example, enable a navigation of an individual or vehicle through an area of the scene. For example, embodiments of the present principles can be used to enable navigation of an autonomous vehicle, such as an autonomous car, an aerial vehicle, and/or an underwater vehicle, through an area. Embodiments of a trained embedding space of the present principles can be implemented as an object detector, object classifier, and/or target detector as described above.

Figure 9:
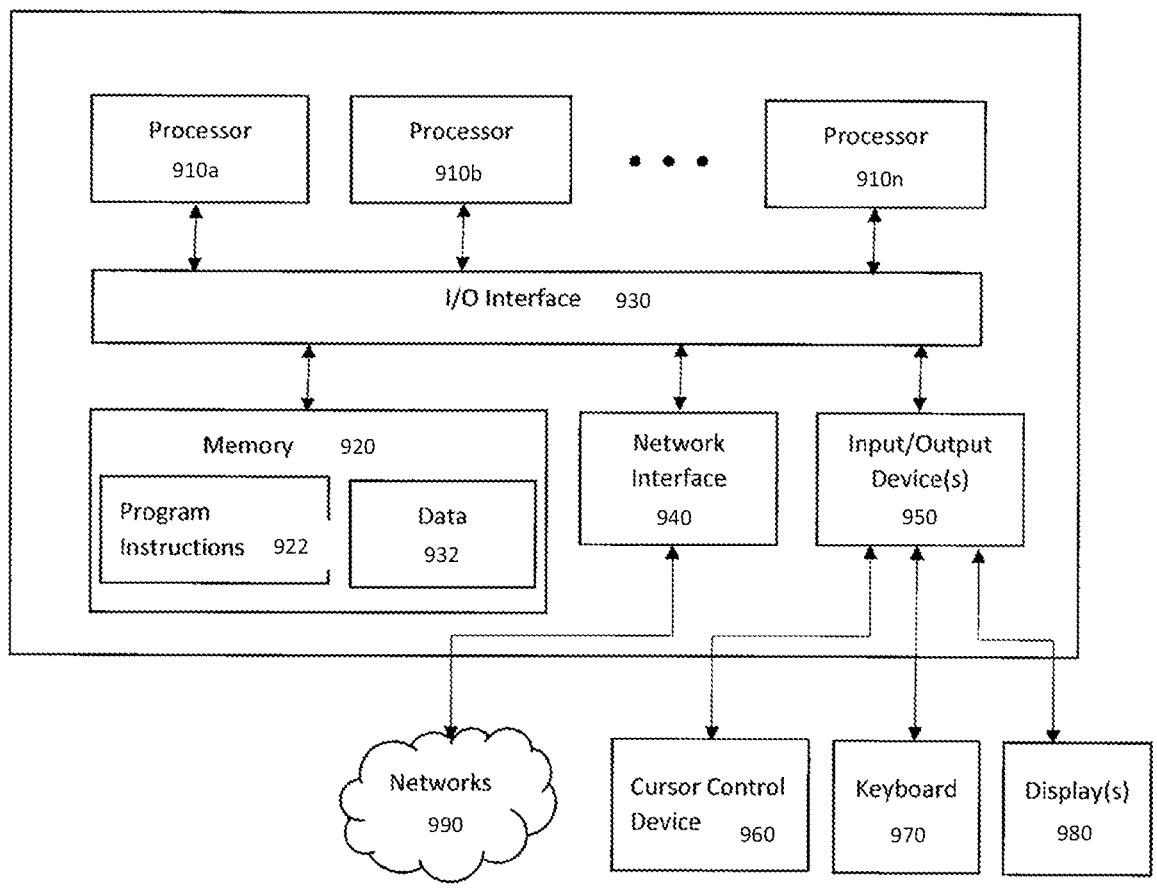
FIG. 9 depicts a high-level block diagram of a computing device suitable for use with embodiments of a sensor data fusion system, such as the sensor data fusion system 100 of FIG. 1, in accordance with an embodiment of the present principles.

As depicted in FIG. 1, embodiments of a sensor data fusion system in accordance with the present principles, such as the sensor data fusion system 100 of FIG. 1, can be implemented in a computing device 900. FIG. 9 depicts a high-level block diagram of a computing device 900 suitable for use with embodiments of a sensor data fusion system in accordance with the present principles such as the sensor data fusion system 100 of FIG. 1. In some embodiments, the computing device 900 can be configured to implement methods of the present as processor-executable executable program instructions 922 (e.g., program instructions executable by processor(s) 910) in various embodiments.

In the embodiment of FIG. 9, the computing device 900 includes one or more processors 910a-910n coupled to a system memory 920 via an input/output (I/O) interface 930. The computing device 900 further includes a network interface 940 coupled to I/O interface 930, and one or more input/output devices 950, such as cursor control device 960, keyboard 970, and display(s) 980. In various embodiments, a user interface can be generated and displayed on display 980. In some cases, it is contemplated that embodiments can be implemented using a single instance of computing device 900, while in other embodiments multiple such systems, or multiple nodes making up the computing device 900, can be configured to host different portions or instances of various embodiments. For example, in one embodiment some elements can be implemented via one or more nodes of the computing device 900 that are distinct from those nodes implementing other elements. In another example, multiple nodes may implement the computing device 900 in a distributed manner.

In different embodiments, the computing device 900 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 900 can be a uniprocessor system including one processor 910, or a multiprocessor system including several processors 910 (e.g., two, four, eight, or another suitable number). Processors 910 can be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 can be configured to store program instructions 922 and/or data 932 accessible by processor 910. In various embodiments, system memory 920 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 920. In other embodiments, program instructions and/or data can be received, sent or stored upon different types of computer-accessible media or on similar media separate from system memory 920 or computing device 900.

In one embodiment, I/O interface 930 can be configured to coordinate I/O traffic between processor 910, system memory 920, and any peripheral devices in the device, including network interface 940 or other peripheral interfaces, such as input/output devices 950. In some embodiments, I/O interface 930 can perform any necessary protocol, timing or other data transformations to convert data signals from one component (e.g., system memory 920) into a format suitable for use by another component (e.g., processor 910). In some embodiments, I/O interface 930 can include support for devices attached through various types of peripheral buses, such as a variant of the Peripheral Component Interconnect (PCI) bus standard or the Universal Serial Bus (USB) standard, for example. In some embodiments, the function of I/O interface 930 can be split into two or more separate components, such as a north bridge and a south bridge, for example. Also, in some embodiments some or all of the functionality of I/O interface 930, such as an interface to system memory 920, can be incorporated directly into processor 910.

Network interface 940 can be configured to allow data to be exchanged between the computing device 900 and other devices attached to a network (e.g., network 990), such as one or more external systems or between nodes of the computing device 900. In various embodiments, network 990 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 950 can, in some embodiments, include one or more display terminals, keyboards, keypads, touchpads, scanning devices, voice or optical recognition devices, or any other devices suitable for entering or accessing data by one or more computer systems. Multiple input/output devices 950 can be present in computer system or can be distributed on various nodes of the computing device 900. In some embodiments, similar input/output devices can be separate from the computing device 900 and can interact with one or more nodes of the computing device 900 through a wired or wireless connection, such as over network interface 940.

Those skilled in the art will appreciate that the computing device 900 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 900 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 900 can communicate with other computing devices based on various computer communication protocols such a Wi-Fi, Bluetooth®. (and/or other standards for exchanging data over short distances includes protocols using short-wavelength radio transmissions), USB, Ethernet, cellular, an ultrasonic local area communication protocol, etc. The computing device 900 can further include a web browser.

Although the computing device 900 is depicted as a general purpose computer, the computing device 900 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 900 can be transmitted to the computing device 900 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 10:
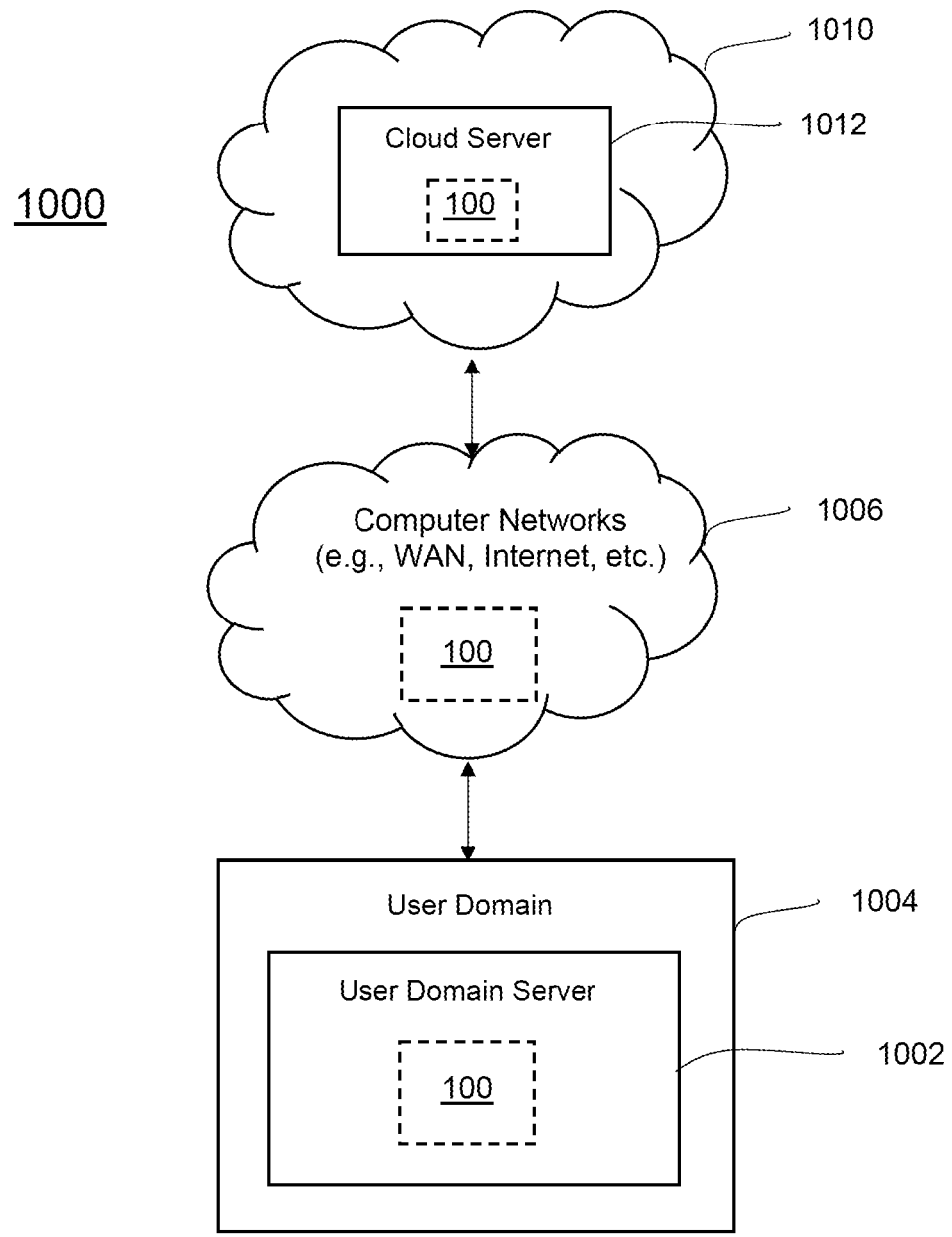
FIG. 10 depicts a high-level block diagram of a network in which embodiments of a sensor data fusion system in accordance with the present principles can be applied.

FIG. 10 depicts a high-level block diagram of a network in which embodiments of a sensor data fusion system in accordance with the present principles, such as the sensor data fusion system 100 of FIG. 1, can be applied. The network environment 1000 of FIG. 10 illustratively comprises a user domain 1002 including a user domain server/computing device 1004. The network environment 1000 of FIG. 10 further comprises computer networks 1006, and a cloud environment 1010 including a cloud server/computing device 1012.

In the network environment 1000 of FIG. 10, a sensor data fusion system in accordance with the present principles, such as the sensor data fusion system 100 of FIG. 1, can be included in at least one of the user domain server/computing device 1004, the computer networks 1006, and the cloud server/computing device 1012. For example, in some embodiments, a user can use a local server/computing device (e.g., the user domain server/computing device 1004) to provide sensor data fusion in accordance with the present principles. In some other embodiments, a user can implement a sensor data fusion system in the computer networks 1006 to provide sensor data fusion in accordance with the present principles. Alternatively or in addition, in some embodiments, a user can implement a sensor data fusion system in the cloud server/computing device 1012 of the cloud environment 1010 to provide sensor data fusion in accordance with the present principles. For example, in some embodiments it can be advantageous to perform processing functions of the present principles in the cloud environment 1010 to take advantage of the processing capabilities and storage capabilities of the cloud environment 1010.

In some embodiments in accordance with the present principles, a sensor data fusion system can be located in a single and/or multiple locations/servers/computers to perform all or portions of the herein described functionalities of a system in accordance with the present principles. For example, in some embodiments of the present principles, some of the components/modules of a sensor data fusion system, such as the feature extraction module 110, the embedding module 120, the fusion module 130, the inference module 135, the optional generator module 140 and the optional discriminator module 150, can be located in one or more than one of the a user domain 1002, the computer network environment 1006, and the cloud environment 1010 and other ones of the components/modules of the sensor data fusion system can be located in at least other ones of the user domain 1002, the computer network environment 1006, and the cloud environment 1010 for providing the functions described above either locally or remotely.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for training a common embedding space for combining sensor data captured from a common scene having at least two modalities, the method comprising:

for each of a plurality of the captured sensor data having a first modality of the at least two modalities, creating respective first modality sensor-data vector representations of features of the sensor data having the first modality using a sensor data-specific neural network;

for each of a plurality of the captured sensor data having a second modality of the at least two modalities, creating respective second modality sensor-data vector representations of the features of the sensor data having the second modality using a sensor data-specific neural network;

embedding the first modality sensor-data vector representations and the second modality sensor-data vector representations in a common embedding space such that embedded modality vectors that are related, across modalities, are closer together in the common embedding space than unrelated modality vectors; and respectively combining the embedded first modality sensor-data vector representations and the second modality vector representations;

wherein at least one of the creating of the first and second modality sensor-data vector representations and the embedding of the first and the second modality sensor-data vector representations are constrained by physics properties of at least one of a respective sensor having captured the first modality sensor data and the second modality sensor data, to prevent captured sensor data having the first modality and sensor data having the second modality captured using physics properties not in compliance with the physics properties of the at least one of the respective sensor from being used to train the common embeddings space, such that the common embedding space is trained using only sensor data having the first modality and sensor data having the second modality captured in compliance with the physics properties of the at least one of the respective sensor.

2. The method of claim 1, wherein a sensor data-specific neural network is pretrained to recognize features of sensor data having a modality to which the sensor data-specific neural network is to be applied.

3. The method of claim 1, wherein the first modality sensor-data vector representations and the second modality sensor-data vector representations are combined using late fusion.

4. The method of claim 1, further comprising:

determining a difference between the plurality of the captured sensor data having the first modality and the captured sensor data having the second modality of the at least two modalities.

5. The method of claim 4, wherein the determined difference between the captured sensor data having the first modality and the second modality is used to determine missing data of one of the first modality or the second modality from captured data of the other one of the second modality or the first modality.

6. The method of claim 4, wherein the difference is determined using a generative adversarial network.

7. The method of claim 1, comprising:

determining a contribution of each of the embedded first modality sensor-data vector representations and the second modality vector representations to the combination.

8. The method of claim 1, wherein the physics properties comprise at least one of surface reflection, temperature, or humidity.

9. A method for at least one of object detection, object classification, or object segmentation in sensor data having at least two modalities using a common embedding space, comprising:

creating respective first modality sensor-data vector representations of features of sensor data having a first modality of the at least two modalities;

creating respective second modality sensor-data vector representations of features of sensor data having a second modality of the at least two modalities;

projecting the first modality sensor-data vector representations and the second modality sensor-data vector representations into the common embedding space such that embedded modality vectors that are related, across modalities, are closer together in the common embedding space than unrelated modality vectors;

combining the projected first modality sensor-data vector representations and the second modality sensor-data vector representations;

determining a similarity between the combined modality sensor-data vector representations and respective embedded vector representations of features of objects in the common embedding space using a distance function, to identify at least one object depicted by the sensor data having the at least two modalities;

wherein at least one of the creating of the first and second modality sensor-data vector representations and the embedding of the first and the second modality sensor-data vector representations are constrained by physics properties of at least one of a respective sensor having captured the first modality sensor data and the second modality sensor data, to prevent captured sensor data having the first modality and sensor data having the second modality captured using physics properties not in compliance with the physics properties of the at least one of the respective sensor from being used to train the common embeddings space, such that the common embedding space is trained using only sensor data having the first modality and sensor data having the second modality captured in compliance with the physics properties of the at least one of the respective sensor.

10. The method of claim 9, comprising:
  determining a difference between the plurality of the sensor data having the first modality and the sensor data having the second modality of the at least two modalities.

11. The method of claim 10, wherein at least one of the first modality sensor-data vector representations and the second modality sensor-data vector representations are created using the determined difference between the plurality of the sensor data having the first modality and the sensor data having the second modality.

12. The method of claim 9, wherein at least one of the first modality sensor-data vector representations and the second modality sensor-data vector representations are created using a sensor data-specific neural network.

13. The method of claim 9, wherein a contribution of each of the embedded first modality sensor-data vector representations and the second modality vector representations to the combination is predetermined.

14. The method 13, wherein the first modality sensor-data vector representations and the second modality sensor-data vector representations are combined using attention-based mode fusion.

15. An apparatus for object detection in sensor data having at least two modalities using a common embedding space, comprising:
  at least one feature extraction module configured to create respective first modality sensor-data vector representations of features of sensor data having a first modality of the at least two modalities and respective second modality sensor-data vector representations of features of sensor data having a second modality of the at least two modalities;
  at least one embedding module configured to project the first modality sensor-data vector representations and the second modality sensor-data vector representations into the common embedding space such that embedded modality vectors that are related, across modalities, are closer together in the common embedding space than unrelated modality vectors;
  a fusion module configured to combine the projected first modality sensor-data vector representations and the second modality sensor-data vector representations;
  an inference module configured to determine a similarity between the combined modality sensor-data vector representations and respective embedded vector representations of features of objects in the common embedding space using a distance function to identify at least one object depicted by the sensor data having the at least two modalities;
  wherein at least one of the creating of the first and second modality sensor-data vector representations and the embedding of the first and the second modality sensor-data vector representations are constrained by physics properties of at least one of a respective sensor having captured the first modality sensor data and the second modality sensor data, to prevent captured sensor data having the first modality and sensor data having the second modality captured using physics properties not in compliance with the physics properties of the at least one of the respective sensor from being used to train the common embeddings space, such that the common embedding space is trained using only sensor data having the first modality and sensor data having the second modality captured in compliance with the physics properties of the at least one of the respective sensor.

16. The apparatus of claim 15, further comprising:
  a generative adversarial network configured to determine a difference between the plurality of the sensor data having the first modality and the sensor data having the second modality of the at least two modalities.

17. The apparatus of claim 16, wherein the generative adversarial network uses the determined difference between the sensor data having the first modality and the second modality to determine missing data of one of the first modality or the second modality from data of the other one of the second modality or the first modality.

18. The apparatus of claim 15, wherein the fusion module is configured to determine a contribution of each of the projected first modality sensor-data vector representations and the second modality sensor-data vector representations of the at least two modalities to the combination.

19. The apparatus of claim 18, wherein the fusion module is configured to apply attention-based mode fusion to combine the first modality sensor-data vector representations and the second modality sensor-data vector representations.

20. The apparatus of claim 15, wherein the physics properties comprise at least one of surface reflection, temperature, or humidity.

\* \* \* \* \*